United States Patent
Rodriguez Bravo

(10) Patent No.: US 10,755,157 B2
(45) Date of Patent: Aug. 25, 2020

(54) ADVANCE ALERT SYSTEM AGAINST COPY OF CONTACT-LESS CARD INFORMATION

(71) Applicant: INTERNATIONAL BUSINESS MACHINES CORPORATION, Armonk, NY (US)

(72) Inventor: Cesar Augusto Rodriguez Bravo, Alajuela (CR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/934,056

(22) Filed: Mar. 23, 2018

(65) Prior Publication Data
US 2019/0294945 A1    Sep. 26, 2019

(51) Int. Cl.
*G06K 19/073*    (2006.01)
*G06K 19/07*    (2006.01)
(Continued)

(52) U.S. Cl.
CPC ... *G06K 19/07309* (2013.01); *G06K 7/10237* (2013.01); *G06K 19/0716* (2013.01); *G06K 19/0723* (2013.01); *G06K 19/07749* (2013.01)

(58) Field of Classification Search
CPC ........ G06K 19/07309; G06K 19/0774; G06K 19/07749; G06K 19/0702; G06K 19/07701
(Continued)

(56) References Cited

U.S. PATENT DOCUMENTS 5,705,852 A * 1/1998 Orihara ............ G06K 19/07749
257/679
7,100,835 B2 9/2006 Selker
(Continued)

FOREIGN PATENT DOCUMENTS

WO    2013096557 A1    6/2013

OTHER PUBLICATIONS

Alphr, "Here's how to protect your contactless card from scammers on public transport", Technology, Feb. 17, 2016, 17 pages, http://www.alphr.com/technology/1002719/heres-how-to-protect-your-contactless-card-from-scammers-on-public-transport.
(Continued)

*Primary Examiner* — Vernal U Brown
(74) *Attorney, Agent, or Firm* — Anthony M. Pallone

(57) ABSTRACT

A structure for a contact-less card, the contact-less card may include a buzzer coupled to a fixed power source. The contact-less card may include a vibration motor coupled to the fixed power source. The contact-less card may include a controller coupled to the buzzer and the vibration motor. The controller includes a first integrated circuit. The first integrated circuit transmits a trigger signal to the buzzer and the vibration motor based on an enablement signal. The contact-less card may include a contact-less communication controller electrically coupled to the controller. The contact-less communication controller comprises a second integrated circuit containing card information. The second integrated circuit transmits the card information based on an induced voltage. The second integrated circuit transmits the enablement signal to the controller based on an induced voltage. The contact-less card may include an antenna electrically coupled to the contact-less communication controller. The antenna transmits card information.

16 Claims, 4 Drawing Sheets

(51) Int. Cl.
  *G06K 7/10* (2006.01)
  *G06K 19/077* (2006.01)
(58) Field of Classification Search
  USPC .......................................................... 340/7.6
  See application file for complete search history.

(56) References Cited

U.S. PATENT DOCUMENTS

| | | | |
|---|---|---|---|
| 7,597,250 B2 | 10/2009 | Finn | |
| 7,624,927 B2 | 12/2009 | Lu et al. | |
| 7,815,126 B2 | 10/2010 | Top | |
| 7,946,501 B2* | 5/2011 | Borracci | G06K 19/0718 235/380 |
| 7,950,585 B2 | 5/2011 | Skowronek et al. | |
| 8,536,981 B2 | 9/2013 | Seban et al. | |
| 8,537,025 B2 | 9/2013 | Le Garrec et al. | |
| 8,602,306 B2 | 12/2013 | Deborgies | |
| 9,379,841 B2 | 6/2016 | Fine et al. | |
| 2003/0107300 A1* | 6/2003 | Nakamura | H04R 17/00 310/324 |
| 2006/0290519 A1* | 12/2006 | Boate | G07C 9/00111 340/573.4 |
| 2009/0159678 A1* | 6/2009 | Day | G06K 19/0701 235/439 |
| 2010/0013631 A1 | 1/2010 | Laackmann et al. | |
| 2014/0015822 A1* | 1/2014 | Hu | H02J 7/0055 345/212 |
| 2016/0203346 A1 | 7/2016 | Gardiner et al. | |
| 2016/0307189 A1 | 10/2016 | Zarakas et al. | |
| 2017/0326024 A1* | 11/2017 | Hernandez | A61B 5/6843 |
| 2018/0129831 A1 | 5/2018 | Yokoi et al. | |

OTHER PUBLICATIONS

Bischoff, "Could you fall prey to a contactless conman? How Thieves can take money from your card as you're walking down the street", Daily Mail News UK, Published Oct. 18, 2016, 47 pages, http://www.dailymail.co.uk/news/article-3849368/Could-fall-prey-contactless-conman-thieves-money-card-walking-street.html.

GlobeNewswire, "Index launches breakthrough fingerprint sensor for contactless smart cards", One News Page, Press Releases, Jun. 23, 2017, 4 pages.

Gunn, "Could this £6 gadget protect your wallet from fraudsters trying to 'skim' your contactless card details?" This is Money, Financial Website UK, published Apr. 15, 2016, 10 pages.

Instructables, "How to Disable contactless Payment on your Debit Card", Technology, Wireless, NTT, Posted Sep. 15, 2013, 16 pages, http://www.instructables.com/id/How-to-Disable-Contactless-Payment-on-Your-Debit-C/.

Mathis, "NXP develops touch, sensor, card, seals PIN transactions", SecureIDNews, Oct. 31, 2012, 6 pages.

Google Search, "Micro Buzzer Disk", printed Mar. 23, 2018, 2 pages.

Google Search, "Micro Vibration Motor", printed Mar. 23, 2018, 2 pages.

OWL, "OWL Card Minder—Contactless Credit/Debit Fraud Prevention", printed Mar. 23, 2018, 4 pages, https://www.owl.co.uk/cardminder/.

SignalVault, "Credit & Debit Card Protection Made Easy", printed Mar. 23, 2018, 9 pages, https://www.signal-vault.com/.

SmartMetric, "Your Fingerprint Now Used to Activate Your Credit Card's Wireless Function in a Dual Purpose NFC Contactless as Well as EMV Contact Biometric Credit Card by SmartMetric", Feb. 9, 2016, 2 pages.

Bachelor, "Conctactless card fraud is too easy, says Which?", The Guardian, Jul. 23, 2015, 3 pages.

Burgess-Pike, "Vaultskin Launches VAULTCARD™ in Bid to Combat Contactless Card Fraud", PRWEB News Center, Jul. 7, 2016, 5 pages.

Youtube, "Signal-Vault RFID Blocking Test—Fail", Published May 16, 2014, 2 pages, https://www.youtube.com/watch?v=BE2IWZyluHl.

IBM: List of IBM Patents or Patent Applications Treated as Related (Appendix P), Apr. 9, 2018, pp. 1-2.

Pending U.S. Appl. No. 15/934,141, filed Mar. 23, 2018, entitled: "Method and Apparatus to Enhance the Security of Contact-Less Cards", pp. 1-21.

* cited by examiner

ADVANCE ALERT SYSTEM AGAINST COPY OF CONTACT-LESS CARD INFORMATION

BACKGROUND

The present invention relates, generally, to the field of contact-less smart cards, and more specifically, to enhancing the security of smart contact-less cards.

A contact-less smart card is a contactless credential whose dimensions are credit card size. A contact-less smart card contains embedded integrated circuits that may store, and sometimes process, data and communicate with a terminal through communication protocols such as near-field communication (NFC) and radio-frequency identification (RFID). Contact-less smart cards may be used for business transactions, identification, authentication, and data storage.

BRIEF SUMMARY

A structure for a contact-less card, the contact-less card may include a buzzer electrically coupled to a fixed power source. The contact-less card may include a vibration motor electrically coupled to the fixed power source. The contact-less card may include a controller electrically coupled to the buzzer and the vibration motor. The controller includes a first integrated circuit. The first integrated circuit transmits a trigger signal to the buzzer and the vibration motor based on an enablement signal. The contact-less card may include a contact-less communication controller electrically coupled to the controller. The contact-less communication controller comprises a second integrated circuit containing card information. The second integrated circuit transmits the card information based on an induced voltage. The second integrated circuit transmits the enablement signal to the controller based on an induced voltage. The contact-less card may include an antenna electrically coupled to the contact-less communication controller. The antenna transmits card information received from the contact-less communication controller.

A structure for a contact-less card, the contact-less card may include a buzzer. The contact-less card may include a vibration motor. The contact-less card may include a controller electrically coupled to the buzzer and the vibration motor. The controller includes a first integrated circuit. The first integrated circuit transmits a trigger signal to the buzzer and the vibration motor based on an enablement signal. The contact-less card may include a contact-less communication controller electrically coupled to the controller. The contact-less communication controller comprises a second integrated circuit containing card information. The second integrated circuit transmits the card information based on an induced voltage. The second integrated circuit transmits the enablement signal to the controller based on an induced voltage. The contact-less card may include an antenna electrically coupled to the contact-less communication controller. The antenna transmits card information received from the contact-less communication controller. The antenna is electrically coupled to the buzzer and the vibration motor.

DETAILED DESCRIPTION

Figure 1:
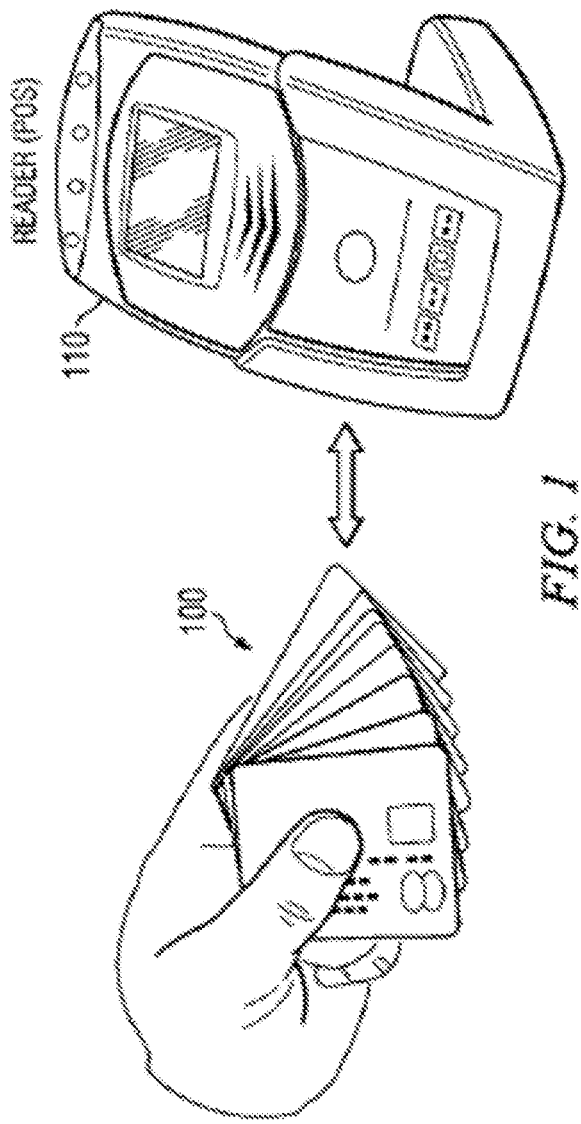
FIG. 1 illustrates a set of contact-less devices.

Near-field communication (NFC) is a set of communication protocols that enable two electronic devices to establish communication by bringing them within a short range of each other (e.g. 10 cm or less). The origins of NFC are rooted in radio-frequency identification (RFID) technology which allows compatible hardware to both supply power to and communicate with an otherwise passive (i.e. unpowered) electronic tag (e.g. an NFC tag/controller) using radio waves. An NFC tag typically includes an integrated circuit (IC) chip with control logic, and an antenna for radio communication. Active tags refer to those that have an internal power source; passive tags refer to those that don't have an internal power source. Active tags can transmit radio frequency information whether or not they are within the interrogation zone of an NFC reader. Passive tags are inductively powered by the radio frequency waves received from the NFC reader, and transmit, or "reflect," a modulated signal containing card information. Active tags are able to transmit much more information than passive tags. However, even passive tags are able to transmit on the order of several kilobits of information. Additionally, an NFC tag may contain a small amount of non-volatile memory which may be used to store personal data.

NFC technology may be used for social networking (e.g. sharing of contacts, photos, videos), identity documents, keycards, and for contact-less payment systems. As such, cards such as credit cards, debit cards, driver's licenses, and other identification cards have seen a technological shift towards contact-less card technologies such as RFID and NFC. For example, Europay, MasterCard, Visa (EMV) cards, which are currently used in the Americas and in many European nations, include integrated circuits and contact plates which may be placed in contact with readers inside payment terminals, and may include NFC circuits which engage in contact-less communications with NFC readers.

While EMV cards and other contact-less cards are relatively secure when implemented along with a magnetic stripe and/or a chip, the contact-less feature nevertheless renders a contact-less card vulnerable to a variety of attacks. For example, some contact-less cards transmit certain account holder information to nearby (e.g. within 10 cm or greater) card readers without encryption. Such information is vulnerable to skimming attacks in which a card reader, which may be concealed, may be used to gain unauthorized access to account holder information (e.g. card number, expiration date). Contact-less cards are also vulnerable to relay attacks in which some attacker relays communications between contact-less cards and contact-less card readers to engage in unauthorized transactions. In view of these and other vulnerabilities of contact-less cards, there is a need for enhanced security within the contact-less card to protect contact-less cardholders and issuers from theft and fraudulent activity.

Embodiments of the present invention disclose an enhanced contact-less card 200, described below, which provides a method and apparatus for enhancing the security of the contact-less card. In embodiments of the invention, enhanced contact-less card 200 may be a contact-less credit/ debit card which includes, in addition to an integrated contact-less communication controller and antenna, an integrated vibration motor and an integrated buzzer powered by an integrated power source. In embodiments of the invention, the integrated contact-less communication controller may be configured for NFC transmission (i.e. an NFC controller) or for RFID transmission (i.e. an RFID controller). Embodiments, and accompanying figures, of the invention may make reference to an integrated NFC controller by way of example only and are not intended to limit the integrated contact-less communication controller to a configuration for an NFC controller. In embodiments of the invention, the integrated NFC controller may transmit a signal to trigger the integrated vibration motor and the integrated buzzer when enhanced contact-less card 200 is in close proximity to an active NFC device, such as a NFC reader. The triggered integrated vibration motor and integrated buzzer may alert the cardholder to an attempted unauthorized read, by a malicious actor, of information stored within enhanced contact-less card 200. In response to the alert, the cardholder may take actions to mitigate any potential identity theft and/or unauthorized charges. Such actions may include, for example, the cardholder calling the financial institution associated with enhanced contact-less card 200, and/or the cardholder disabling enhanced contact-less card 200. Moreover, the sound produced by the triggered integrated buzzer may discourage further criminal activity by the malicious actor.

Embodiments of the present invention will now be described, by way of example only, in detail with reference to the accompanying Figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Moreover, NFC cards are used throughout this disclosure as one example of contact-less cards, however, the techniques disclosed herein may be applied in connection with any contact-less card technologies that are designed for short range communications.

FIG. 1 illustrates a set of contact-less devices 100, which in various embodiments may be smart credit or debit cards, transportation system fare cards, access badges, etc. Each card contains an NFC controller that allows it to communicate with a reader, such as point of sale (POS) reader 110, when the card is placed in close proximity to the reader. Various types of readers and contact-less card technologies exist; for example, smart credit cards use a different contact-less card transport technology than access badges. As used herein the terms "transport technology", "communication protocol", and similar phrases mean the same thing and refer to a specific physical layer and media access layer used for contact-less card communications by a particular smart card or access badge.

Figure 2:
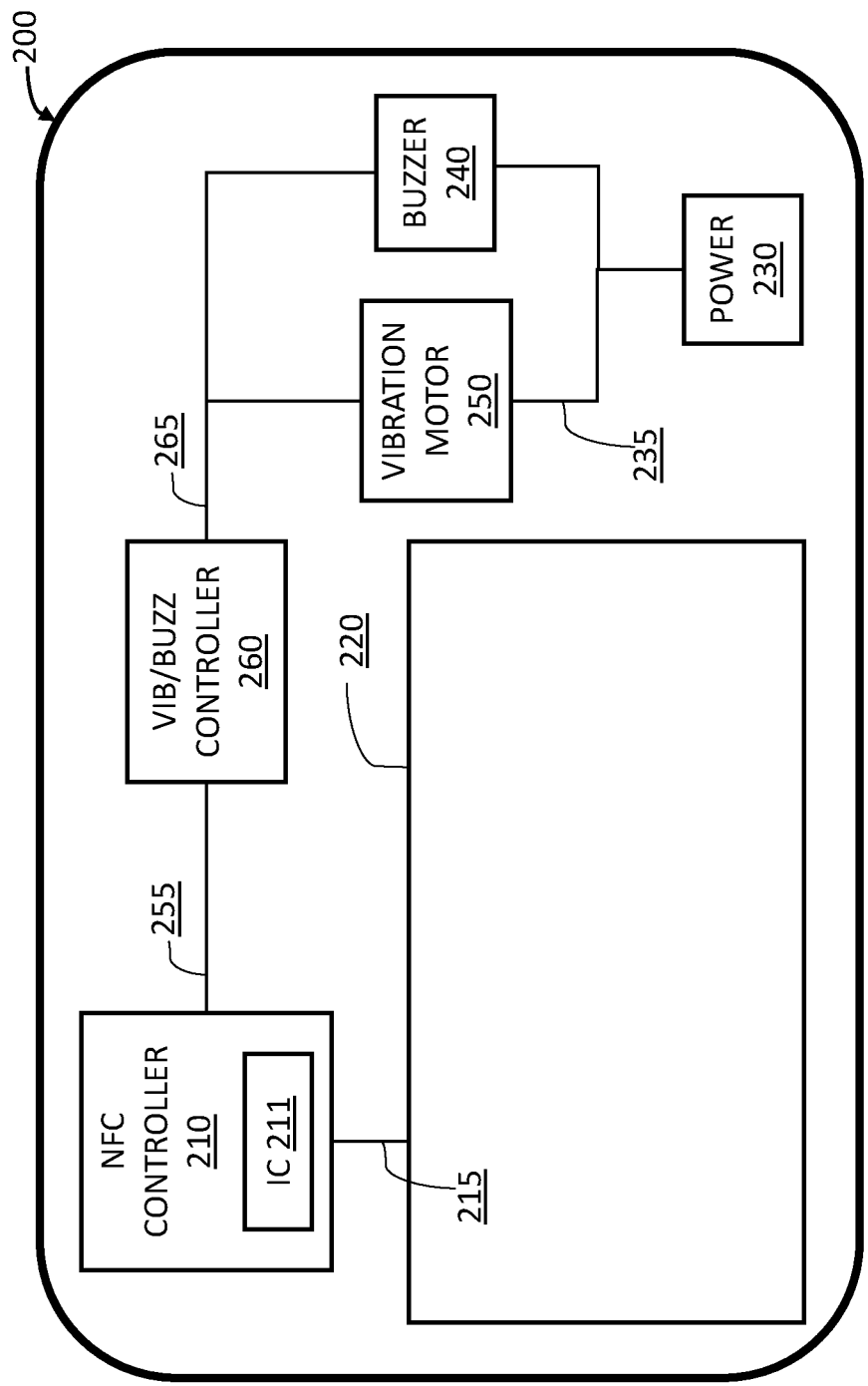
FIG. 2 illustrates an enhanced contact-less card, in accordance with an embodiment of the present invention.

FIG. 2 illustrates an enhanced contact-less card 200, representative of a credit/debit card, in accordance with an embodiment of the present invention. In an example embodiment, enhanced contact-less card 200 may include NFC controller 210, antenna 220, power 230, buzzer 240, vibration motor 250, and vib/buzz controller 260, interconnected via electrical connections 215, 235, 255, and 265. Electrical connection 215 interconnects antenna 220 and NFC controller 210. Electrical connection 235 interconnects power 230, buzzer 240, and vibration motor 250. Electrical connection 255 interconnects vib/buzz controller 260 and NFC controller 210. Electrical connection 265 interconnects buzzer 240, vibration motor 250, and vib/buzz controller 260. In other embodiments, enhanced contact-less card 200 may also include technologies which implement contact-based card functions (e.g. a contact plate, a magnetic strip). Furthermore, in various embodiments, enhanced contact-less card 200 may implement any available contact-less card technologies and/or contact-less card technologies which may be developed subsequent to this disclosure. Currently available contact-less card technologies include, e.g., RFID and NFC technologies, each of which is defined by a variety of technical specifications. The technical specifications are updated and modified on an ongoing basis by the authorities responsible for RFID, NFC, and supporting standards. Enhanced contact-less card 200 may implement any RFID and/or NFC technical specification, as will be appreciated by those of skill in the art. The operations and functions of enhanced contact-less card 200 are described in further detail below with regard to FIG. 4.

In an example embodiment, NFC controller 210 may include an integrated circuit (IC) chip 211 inlayed on a dielectric backing. IC chip 211 may be connected, via electrical connection 215, to antenna 220 which may also be inlayed on the same dielectric backing as IC chip 211. In an example embodiment, IC chip 211 may be any microprocessor device configured to exchange data electromagnetically. IC chip 211 may include a radio frequency inductor, volatile or non-volatile memory storage, a microprocessor, and/or circuitry logic. Additionally, NFC controller 210 may include a small amount of non-volatile memory (not shown) for example, some kind of EEPROM, which may be used to store information. In an example embodiment, IC chip 211 may contain circuitry logic to enable NFC controller 210 to transmit card information. The circuitry logic within IC chip 211 may enable NFC controller 210 upon the presence of a sufficient induced voltage in antenna 220. The induced voltage within antenna 220 may result from impinging radio frequency electromagnetic waves from, for example, an NFC reader (not shown). IC chip 211 may modulate the induced voltage in antenna 220 in accordance with data and logic stored within the non-volatile memory as a means for transmitting information to the NFC reader. Furthermore, in an example embodiment, the circuitry logic within IC chip 211 may operate to transmit, via electrical connection 255, a signal to vib/buzz controller 260 in response to enablement of NFC controller 210. In various embodiments, the dielectric backing can be, for example, a credit/debit card or other smart card, an identification badge, etc. In an example embodiment, NFC controller 210 and IC chip 211 may be implemented within a credit card. In response to the presence of a sufficient induced voltage in antenna 220, NFC controller 210 may become enabled and transmit, via IC chip 211 and antenna 220, card information such as, cardholder name, card issuer (e.g. Visa, AMEX), bank name, purchase history, card type, 16-digit account number, country code, expiration date, and issue date. Furthermore, in response to becoming enabled, NFC controller 210 may transmit, via IC chip 211 and electrical connection 255, a signal to vib/buzz controller 260.

In embodiments of the invention, antenna 220 may be a thin wire coil which wraps around some or all of the perimeter and/or surface area of a dielectric backing, inlayed within enhanced contact-less card 200, in one or more turns, forming an antenna for receiving the radio frequency transmission from a nearby contact-less card reader. In other embodiments, antenna 220 may be printed on top of enhanced contact-less card 200. Furthermore, in embodiments of the invention, antenna 220 may operate to utilize the received radio frequency transmission to energize NFC controller 210 (i.e. electromagnetic induction) and to transmit card information as determined by logic within IC chip 211.

In an example embodiment, power 230 represents an internal source of electric power for buzzer 240 and vibration motor 250. In an example embodiment, power 230 may be any commercially available or proprietary thin film lithium ion or lithium-polymer battery capable of powering buzzer 240 and vibration motor 250, in accordance with embodiments of the invention. Alternatively, in another embodiment, buzzer 240 and vibration motor 250 may be powered by a nearby NFC reader through electromagnetic induction of antenna 220.

Figure 3:
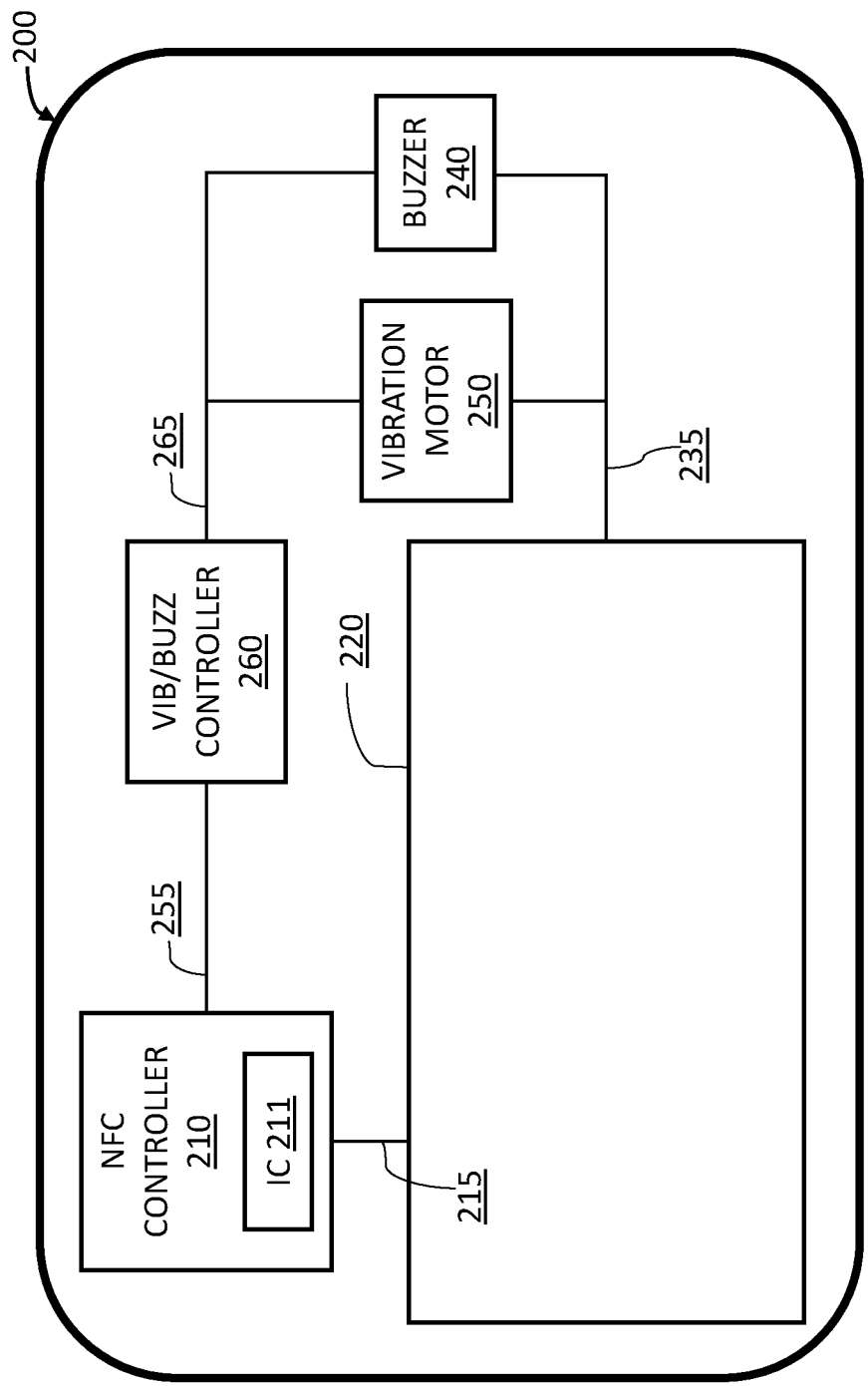
FIG. 3 illustrates an enhanced contact-less card, in accordance with another embodiment of the present invention.

For example, FIG. 3 illustrates an enhanced contact-less card 200, representative of a credit/debit card, in accordance with an embodiment of the present invention where buzzer 240 and vibration motor 250 are powered as a result of electromagnetic induction of antenna 220. In such an embodiment, buzzer 240 and vibration motor 250 may be interconnected with antenna 220 via electrical connection 235. In such an embodiment, impinging radio frequency electromagnetic waves from, for example, a nearby active NFC device (not shown), may induce a voltage within antenna 220 sufficient to power buzzer 240 and vibration motor 250 via electrical connection 235.

In an example embodiment of the invention, vib/buzz controller 260 may be an integrated circuit configured to transmit a signal to buzzer 240 and vibration motor 250 via electrical connection 265. The transmitted signal may have the effect of triggering vibration motor 250 and buzzer 240. Furthermore, in an example embodiment of the invention, vib/buzz controller 260 may contain circuitry logic to transmit the signal to buzzer 240 and vibration motor 250 in response to receiving a signal from NFC controller 210 indicating that NFC controller 210 is enabled for transmission of card information. In another embodiment (not shown) the functionality of vib/buzz controller 260 may be implemented via two separate controllers (i.e. two integrated circuits); one configured to trigger vibration motor 250 via a transmitted signal, and the other configured to trigger buzzer 240 via another transmitted signal.

In embodiments of the invention, buzzer 240 represents a piezoelectric device including a piezoelectric ceramic material, for example, a piezo film speaker. Piezoelectric ceramic materials may be used as speakers in contact-less cards since these thin-form-factor materials may flex back and forth in the presence of an applied voltage (i.e. inverse piezoelectric effect). Furthermore, the piezoelectric ceramic material of buzzer 240 may be bonded to a similarly thin metal diaphragm, for example, bronze. When a voltage is applied to the piezoelectric ceramic material, the piezoelectric ceramic material may flex back and forth, causing the metal diaphragm to bend. When a recurring voltage is applied, buzzer 240 may vibrate at the frequency of the applied voltage and produce an audible sound. In embodiments of the invention, buzzer 240 may be triggered by a signal received from vib/buzz controller 260, via electrical connection 265. In response to the signal received from vib/buzz controller 260, buzzer 240 may begin to produce sound within enhanced contact-less card 200. The signal received from vib/buzz controller 260 may be transmitted in response to enablement of NFC controller 210.

In embodiments of the invention, vibration motor 250 represents any commercially available or proprietary piezoelectric actuator or any commercially available or proprietary linear resonant actuator capable of supporting the functionality required of embodiments of the invention. In embodiments of the invention, vibration motor 250 may be triggered by a signal received from vib/buzz controller 260, via electrical connection 265. In response to the signal received from vib/buzz controller 260, vibration motor 250 may begin to vibrate within enhanced contact-less card 200. The signal received from vib/buzz controller 260 may be transmitted in response to enablement of NFC controller 210.

In embodiments of the invention, electrical connections 215, 235, 255, and 265 represent electrical connections which form direct connections between power 230, buzzer 240, vibration motor 250, vib/buzz controller 260, NFC controller 210, and antenna 220. Electrical connection 215 interconnects antenna 220 and NFC controller 210. Electrical connection 235 interconnects power 230, buzzer 240, and vibration motor 250. Electrical connection 255 interconnects vib/buzz controller 260 and NFC controller 210. Electrical connection 265 interconnects buzzer 240, vibration motor 250, and vib/buzz controller 260.

Figure 4:
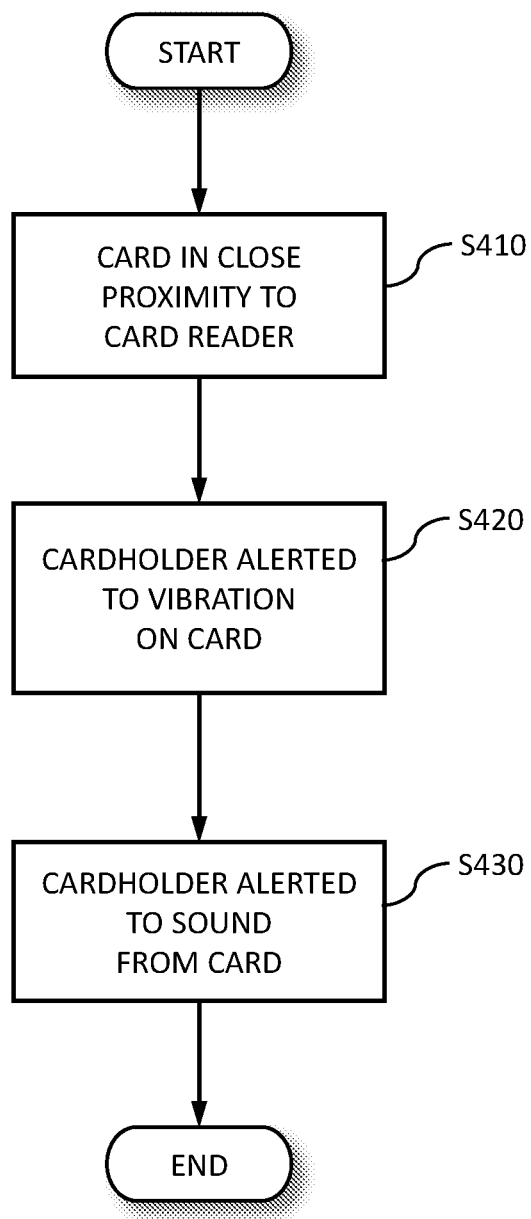
FIG. 4 is an example use case illustrating the operations of the contact-less card of FIG. 2, in accordance with an embodiment of the present invention.

FIG. 4 describes a use case illustrating the operations of enhanced contact-less card 200 during an unintended use, in accordance with an embodiment of the invention. Referring to step S410, a cardholder may be in a location where enhanced contact-less card 200 is, unknowingly and unintendedly, located in close proximity to a card reader such as a NFC card reader. For example, the cardholder may be in a populated public space such as a shopping center or a crowded train car. Such a location may afford a malicious actor the opportunity to place a concealed NFC card reader in close proximity to enhanced contact-less card 200 and attempt to steal card information via the concealed NFC card reader (e.g. an NFC enabled smartphone, a chip reader, any active NFC device). This is known as skimming. Furthermore, in such a location, enhanced contact-less card 200 may be stored in a pocket, wallet, or other container when not in use for an intended transaction. The close proximity to the NFC card reader may produce a voltage within antenna 220 as a result of electromagnetic induction from the nearby NFC card reader. The induced voltage within antenna 220 may be sufficient to power the components (i.e. IC chip 211, non-volatile memory) within NFC controller 210, via electrical connection 215. Circuitry logic within IC chip 211 may operate to detect the presence of the induced voltage within antenna 220, via electrical connection 215, and enable NFC controller 210 to transmit card information. Furthermore, circuitry logic within IC chip 211 may also operate to transmit, via electrical connection 255, a signal to vib/buzz controller 260 in response to enablement of NFC controller 210.

Referring to step S420, the cardholder may be alerted to the vibration of enhanced contact-less card 200. Vib/buzz controller 260 may contain circuitry logic to transmit, via electrical connection 265, a signal to vibration motor 250 in response to receiving a signal from NFC controller 210 indicating that NFC controller 210 is enabled for transmission of card information. In response to the signal received from vib/buzz controller 260, vibration motor 250 may be triggered and begin to vibrate within enhanced contact-less card 200. The resulting vibration may be sufficient enough to be felt by the cardholder despite its location in a pocket, wallet, or other container. The felt vibration may alert the cardholder to an attempted unauthorized read of card information by a malicious actor and may further prompt the cardholder to take some kind of action such as calling the financial institution associated with enhanced contact-less card 200, and/or disabling enhanced contact-less card 200.

Referring to step S430, the cardholder may be alerted to the buzzing sound emanating from enhanced contact-less card 200. Vib/buzz controller 260 may contain circuitry logic to transmit, via electrical connection 265, a signal to buzzer 240 in response to receiving a signal from NFC controller 210 indicating that NFC controller 210 is enabled for transmission of card information. In response to the signal received from vib/buzz controller 260, buzzer 240 may be triggered and begin to produce sound from within enhanced contact-less card 200. The resulting sound may be sufficient enough to be heard by the cardholder despite its location in a pocket, wallet, or other container. The heard sound may alert the cardholder to an attempted unauthorized read of card information by a malicious actor and may further prompt the cardholder to take some kind of action such as calling the financial institution associated with enhanced contact-less card 200, and/or disabling enhanced contact-less card 200. Moreover, the sound produced by the triggered buzzer 240 may discourage further criminal activity by the malicious actor.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

Furthermore, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

What is claimed is:

1. A contact-less card, the contact-less card comprising:
   a buzzer electrically coupled to a fixed power source, wherein the fixed power source comprises a lithium-polymer battery;
   a vibration motor electrically coupled to the fixed power source;
   a controller electrically coupled to the buzzer and the vibration motor, wherein the controller comprises a first integrated circuit, and wherein the first integrated circuit transmits a trigger signal to the buzzer and the vibration motor based on receipt of an enablement signal, and wherein the trigger signal activates the buzzer and the vibration motor concurrently;
   a contact-less communication controller electrically coupled to the controller, wherein the contact-less communication controller comprises a second integrated circuit containing card information, and wherein the second integrated circuit transmits the card information based on an induced voltage, and wherein the second integrated circuit transmits the enablement signal to the controller based on the induced voltage; and
   an antenna electrically coupled to the contact-less communication controller, wherein the antenna transmits the card information received from the contact-less communication controller.

2. The contact-less card of claim 1, wherein the contact-less communication controller is configured for NFC transmission or RFID transmission.

3. The contact-less card of claim 1, wherein an induced voltage within the antenna powers the second integrated circuit and the first integrated circuit.

4. The contact-less card of claim 1, wherein the second integrated circuit comprises a microprocessor device configured to exchange data electromagnetically.

5. The contact-less card of claim 1, wherein the antenna comprises a thin-wire coil configured to receive a radio frequency transmission, and wherein a radio frequency magnetic field associated with the received radio frequency transmission induces a voltage within the antenna.

6. The contact-less card of claim 1, wherein the buzzer comprises a piezoelectric ceramic material bonded to a thin metal diaphragm.

7. The contact-less card of claim 1, wherein the vibration motor comprises a piezoelectric actuator or a linear resonant actuator.

8. The contact-less card of claim 1, wherein the fixed power source powers the buzzer and the vibration motor.

9. A contact-less card, the contact-less card comprising:
   a buzzer;
   a vibration motor;
   a controller electrically coupled to the buzzer and the vibration motor, wherein the controller comprises a first integrated circuit, and wherein the first integrated circuit transmits a trigger signal to the buzzer and the vibration motor based on receipt of an enablement signal, and wherein the trigger signal activates the buzzer and the vibration motor concurrently;
   a contact-less communication controller electrically coupled to the controller, wherein the contact-less communication controller comprises a second integrated circuit containing card information, and wherein the second integrated circuit transmits the card information based on an induced voltage, and wherein the second integrated circuit transmits the enablement signal to the controller based on the induced voltage; and
   an antenna electrically coupled to the contact-less communication controller, wherein the antenna transmits the card information received from the contact-less communication controller, and wherein the antenna is electrically coupled to the buzzer and the vibration motor.

10. The contact-less card of claim 9, wherein the contact-less communication controller is configured for NFC transmission or RFID transmission.

11. The contact-less card of claim 9, wherein an induced voltage within the antenna powers the second integrated circuit and the first integrated circuit.

12. The contact-less card of claim 9, wherein an induced voltage within the antenna powers the buzzer and the vibration motor.

13. The contact-less card of claim 9, wherein the integrated circuit comprises a microprocessor device configured to exchange data electromagnetically.

14. The contact-less card of claim 9, wherein the antenna comprises a thin-wire coil configured to receive a radio frequency transmission, and wherein a radio frequency magnetic field associated with the received radio frequency transmission induces a voltage within the antenna.

15. The contact-less card of claim 9, wherein the buzzer comprises a piezoelectric ceramic material bonded to a thin metal diaphragm.

16. The contact-less card of claim 9, wherein the vibration motor comprises a piezoelectric actuator or a linear resonant actuator.

* * * * *